Oct. 21, 1958 S. A. JACQUES 2,857,227
FOLDING SUPPORT AND HINGE THEREFOR
Filed Nov. 18, 1957 3 Sheets-Sheet 1
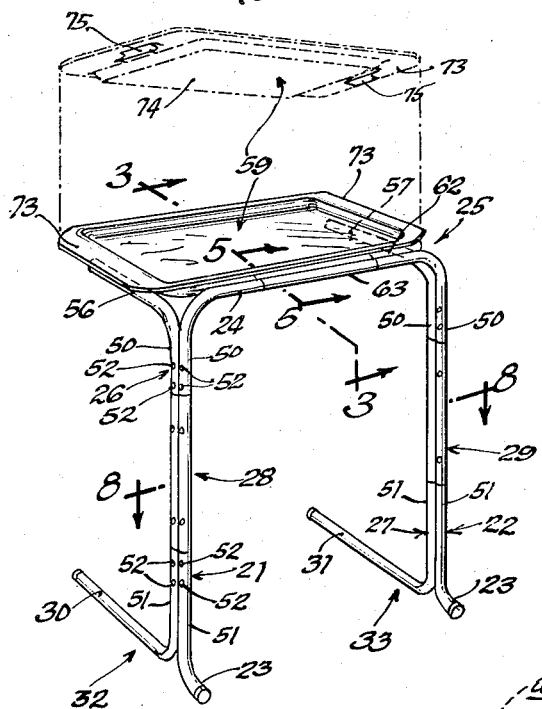
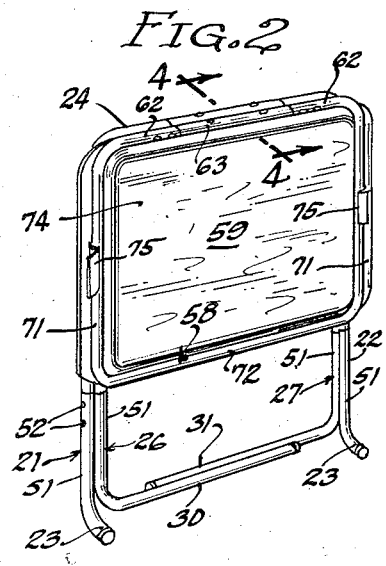
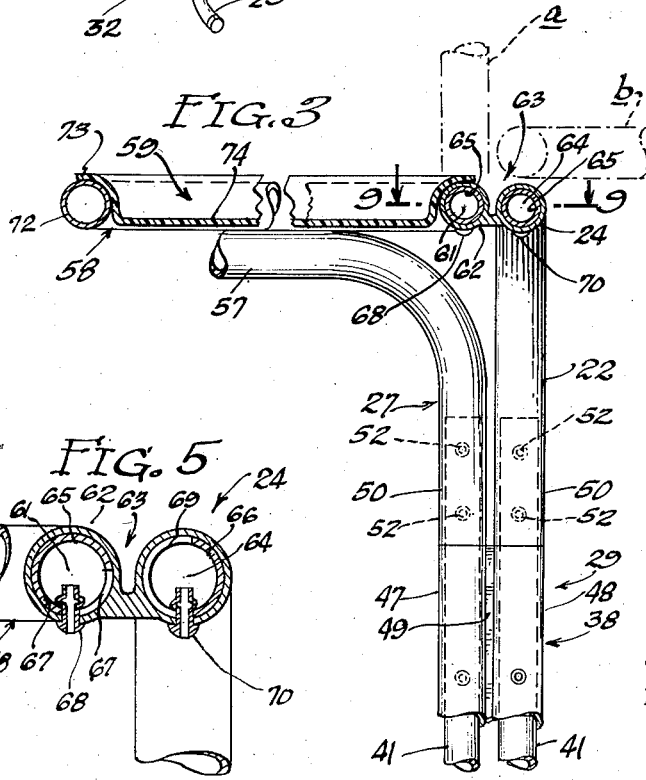
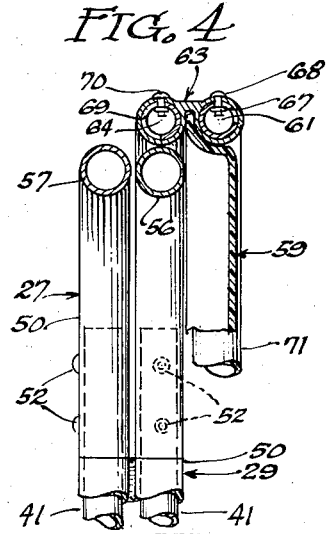
INVENTOR.
Stanley A. Jacques
BY
Attorney Oct. 21, 1958 S. A. JACQUES 2,857,227
FOLDING SUPPORT AND HINGE THEREFOR
Filed Nov. 18, 1957 3 Sheets-Sheet 2
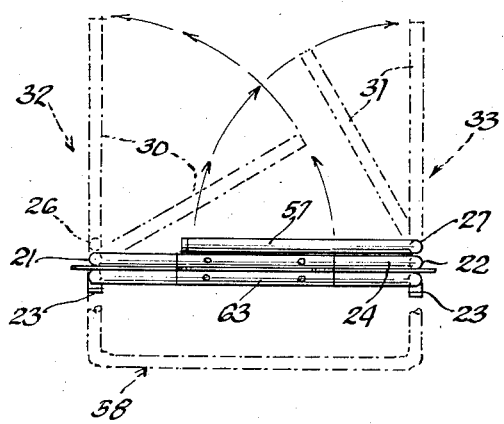
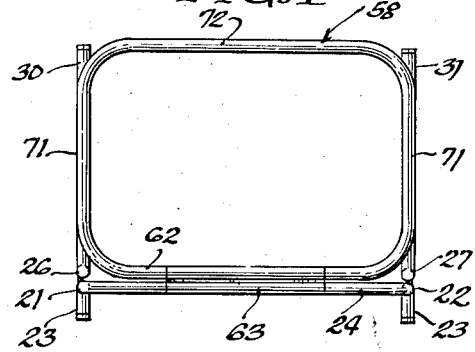
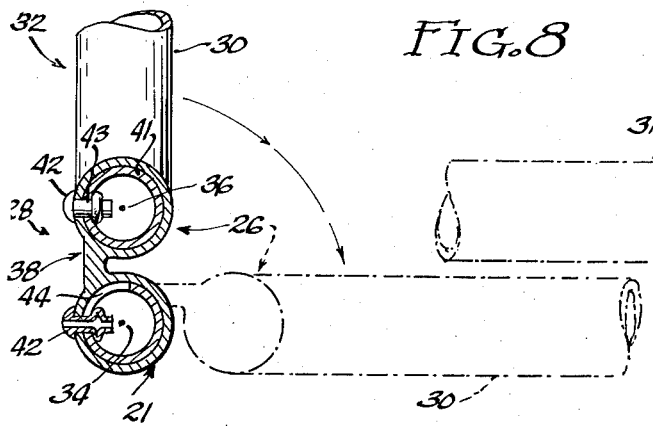
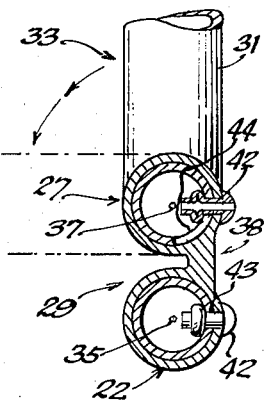
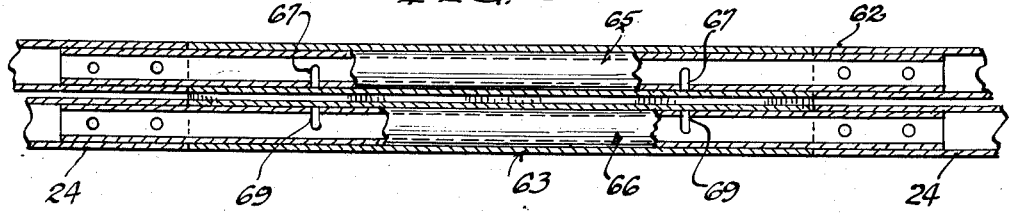
INVENTOR.
Stanley A. Jacques
BY
Attorney Oct. 21, 1958  S. A. JACQUES  2,857,227
FOLDING SUPPORT AND HINGE THEREFOR
Filed Nov. 18, 1957  3 Sheets-Sheet 3

INVENTOR.
Stanley A. Jacques
BY
Attorney

United States Patent Office 2,857,227
Patented Oct. 21, 1958

2,857,227

FOLDING SUPPORT AND HINGE THEREFOR

Stanley A. Jacques, Los Angeles, Calif.

Application November 18, 1957, Serial No. 697,076

9 Claims. (Cl. 311—80)

This invention relates to folding support structures such as are typically used in folding furniture. A folding support of the general type in question, used in a folding table, is shown in my United States Patent No. 2,692,175.

A very important aspect of the invention relates to a novel type of hinge arrangement that is highly useful in interconnecting different parts of the supporting structure that are to have relative swinging movement during conversion of the structure between its use condition and its folded condition. This hinge arrangement type is such that hinges constructed in accordance with it are simple and inexpensive to manufacture, provide unusual rigidity and stability in support structures wherein they are assembled, and are easy to manipulate when so assembled to permit easy accomplishment of folding and unfolding operations. An important feature of the hinge arrangement is its provision with means to limit the degree and define the paths of angular relative movement between parts that it interconnects. Furthermore the structural arrangement of the hinge is such as to permit wide latitude in the choice of the angular extent and definition of the relative movements that it permits between such parts, and provides for ready accomplishment of such selections.

It is therefore a primary object of the invention to provide a novel, exceptionally strong and rigid but thoroughly simple and inexpensive hinge, having a capacity of great flexibility in the matter of extents and definition of relative movements between parts that it interconnects.

An equally important object is the provision of a novel, light weight, visually attractive, highly stable and strong, but inexpensive folding support that is easily unfolded and folded to an unusually compact condition, and that ideally employs the hinge device referred to.

Still another object is the provision of a novel and exceptionally strong and rugged folding support in the nature of a table.

In the accompanying drawings:

Fig. 1 is a perspective view of a folding table arranged according to the invention and shown in its condition of use.

Fig. 2 is a perspective view showing the table in folded condition.

Fig. 3 is a fragmentary, enlarged, vertical section on line 3—3 of Fig. 1.

Fig. 4 is a fragmentary, enlarged, vertical section on line 4—4 of Fig. 2.

Fig. 5 is a fragmentary, enlarged vertical section on line 5—5 of Fig. 1.

Fig. 6 is a plan, indicating the procedure followed in unfolding the table.

Fig. 7 is a plan of the foldable support structure of the table as it appears in its condition of use, or unfolded.

Fig. 8 is an enlarged horizontal section on line 8—8 of Fig. 1.

Fig. 9 is a horizontal section on line 9—9 of Fig. 3.

Figs. 14, 15, 16 and 17 are sections respectively on lines 14—14, 15—15, 16—16 and 17—17 of Figs. 10 to 13.

Figure 18:
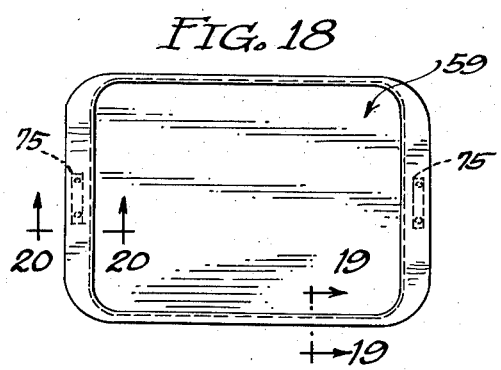

Fig. 18 is a plan of a tray used in the table form of the invention shown in Figs. 1 to 9.

Figure 19:
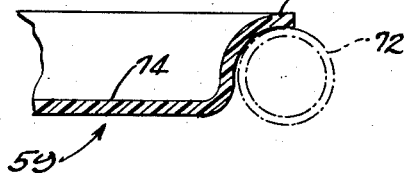
Figure 20:
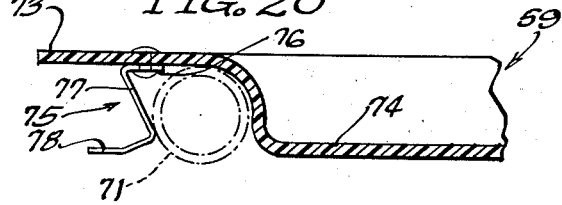

Figs. 19 and 20 are enlarged sections respectively on lines 19—19 and 20—20 of Fig. 18.

First describing the leg structure of a support constructed in accordance with the invention, and which of itself constitutes a novel and useful type of support organization that can be used as a support for a wide variety of purposes, there are provided a pair of elongate leg elements 21, 22 that are intended for vertical disposition in the use condition of the structure. Elements 21, 22 preferably have somewhat off-bent foot ends 23 for support on an underlying surface. Leg elements 21, 22 are maintained substantially parallel by intervening, rigid structure, shown as a cross element 24 formed integral with the upper portions of the leg elements to form a U-shaped main frame member, generally designated 25 in Fig. 1.

Parallel respectively to the different main frame leg elements 21, 22 are different ones of a second pair of leg elements 26, 27. In the unfolded or use condition of the assembly elements 26, 27 lie to the same sides of the different leg elements 21, 22 to which respectively they are more adjacent, and they are spaced therefrom narrowly in directions extended substantially at right angles to the spacing between elements 21, 22. Elements 26, 27 are pivotally connected to elements 21, 22 respectively by hinges 28, 29. The different ones of the second or side leg elements 26, 27 are provided with foot portions 30, 31, which preferably are integral with the lower portions and extend at right angles from elements 26, 27. In the unfolded or use condition of the structure they extend from elements 26, 27 in the directions in which the latter are spaced from the adjacent elements 21, 22. The pair of elements 26 and 30 form one side member designated generally 32, and elements 27 and 31 form a second side member designated 33.

In the folding of the structure so far described, the side members 32, 33 are swung toward each other into general parallelism with each other and with the main frame member 25. From Fig. 8 it will be seen that were both side members to pivot about corresponding axes, such as axes 34, 35 of the main leg elements 21, 22 or axes 36, 37 of the side member leg elements 26, 27, interference would occur between the side member foot portions 30, 31. The hinges now to be described, generally designated 28, 29 in Fig. 1, are so arranged that one side member, shown as 32, pivots about the axis 34 of the adjacent main member leg element 21, while the other side member 33 pivots about the axis 37 of the leg element 27 of that member, resulting in the overlapped condition of side members 32, 33 indicated in dash lines in Fig. 8, while the structure is in folded condition.

Referring to Figs. 8 and 10 to 17, the general arrangement of the hinges, as 28, 29, includes a connector 38 that is of generally oblong outline and that contains a pair of parallel, cylindrical bores 39, 40 spaced apart in correspondence to the required spacing between the adjacent leg element axes 34, 36 and 35, 37. Each of the paired leg elements that are interconnected by a hinge, 21, 26 and 22, 27, has an intermediate cylindrical portion, which in Fig. 8 are designated 41, and these are extended through the bores of the connector 38 of that hinge. Each leg portion 41 is fixed with respect to the remainder of the leg element with which it is associated. To select which of the axes of the interconnected legs the pivotal movement is centered on, one of the two cylindrical intermediate leg portions 41 that penetrate the same hinge connector is fixed to that connector so that one cannot swing relative to the other, while the other of these leg portions 41 that extends through that same connector is left free to turn in the connector bore, the axis of the latter portion being the one about which the relative pivotal motion between the interconnected parts takes place. As shown in Fig. 8, identities of the leg portions that are fixed and free to swing in the hinge connector bores, are selected by radial pins 42 that penetrate holes in the connector and project inward into the bores. In the case of the portions 41 that are to be fixed in the connectors, those of leg elements 22 and 26 in Fig. 8, pins 42 project into cylindrical pockets 43 in the portions 41, to lock the connector and that element 41 against relative movement. In the elements that are to swing relative to the connector 21, and 27 in Fig. 8, the pins 42 project into slot-like pockets 44 in the corresponding leg portions 41, that are extended circumferentially of those portions to provide clearance for the required swinging motion. The extents and definition of the locations of the paths in which the swingable elements may rotate are selected respectively by the spacing between and the angular locations of the ends of the pocket slots 44, into contact with which the engaging pins 42 come to terminate such movements.

Reference to Fig. 8, and the arrangement of leg element portions 41, pins 42, cylindrical pockets 43 and extended pockets 44, will show that the left hand member 32, including leg element 26, and the connector of hinge 28 is free to swing about the axis 34 of the main leg element 21 from its open position, shown in full lines, through approximately ninety degrees to its folded position shown in dotted lines. The right hand member 31, however, is free to swing only about the axis 37 of the side member leg element 27, through a similar ninety degree path. Constraint of the two members to swing about the different spaced axes 34, 37 results in their swinging to the overlapped relation shown in Fig. 6, and contributes substantially to the compact neatness that the structure has while folded.

Figs. 1, 8, 10, 11, 14, 15, 13 and 17, show a preferred detail arrangement of the leg element hinges 28 and 29. In order to assure a high degree of rigidity and strength of proper positional relationship of the interconnected leg elements 21, 26 and 22, 27, in all of their range of relative swinging, and to make the entire support structure rigid and solid while in use, it is preferred that the hinge connector elements 38 be of one piece and rigid construction. For weight and material saving these members 38 advantageously are extrusions of light weight alloy, and each (Figs. 13 and 17) has a pair of barrels 47, 48 that respectively enclose the cylindrical bores 39, 40 and that are interconnected by a reduced web 49 of a width to provide a selected spacing between the axes of the interconnected leg elements. In the particular form shown, the web is offset from centered relation to the barrels. Preferably the leg elements are of light weight alloy tube stock, and most conveniently the cylindrical intermediate portions, 41 in Fig. 8, of these elements are formed by tubes, such as shown in Figs. 8, 10, 11, 14 and 15, of outer diameter matching the inner diameter of the leg element tube stock and which also matches the diameter of the connector bores 39, 40. Each leg element then constitutes upper and lower sections 50, 51 into which are inserted end portions of the tubular members 41. The latter are rigidly secured in the bores of the tubular leg sections by pins 52. It will be seen from comparison of Figs. 10 and 14 with Figs. 11 and 15, that it is a simple matter to provide the tubular elements 41 either with cylindrical pockets 43 as punched or bored holes through the element walls, or with circumferentially elongate pockets 44 as slots, as in Figs. 11 and 15, respectively to serve as the intermediate portions of the fixed leg elements 26 and 22 of Fig. 8, and those of leg elements 21, 27 whereon respectively the hinge connector barrels, 48 of leg element 21, and leg element 27 are swingable. Each tubular intermediate member 41 also is provided with cylindrical pockets 53 located in the end portions which are to be inserted into the tubular leg element sections. These pockets 53 are for reception of the locking pins 52. This structure secures the leg element portions together as well as providing the hinge connection pivot elements as described.

It will be seen that the structure so far described, due principally to the very great rigidity and solidity that is imparted to the structure by the double bore connector type of hinges, presents a structure that is of utility in a large variety of folding supports respectively adapted to different purposes and regardless of such additional arrangements as may be provided to meet a particular type of service. The table top arrangement shown in Figs. 1 to 7 now to be described, and which includes an additional variation of the basic hinge arrangement described above, is an example of an adaptation for such a particular service.

The side members 32, 33 respectively are provided with top-supporting elements or arms 56, 57 which are parallel to and in lateral registration with feet 30, 31, which underlie them in the use or other upright condition of the structure. A top frame 58 is hinged to the main member cross element 24 so that it may be swung between a horizontal position of use, wherein it, and a preferably detachable table top 59 are supported on the side member upper arms 56, 57, as shown in Fig. 1, and a folded position, shown in Figs. 2 to 6, wherein it depends substantially vertically from but laterally displaced from cross element 24 and alongside the main frame member 25. In the latter position, and with lateral members 32, 33 swung in to their folded positions, the table appears as in Fig. 2, wherein its extreme compactness, and neatness while folded is apparent.

Figure 10:
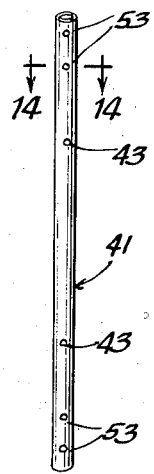
Figs. 10 to 12 are perspective views of different forms of hinge pivot elements, arranged according to the invention, and that may be employed to impose different types and limits of relative movement between parts connected by hinges wherein these elements are used, and as the various pivot elements are employed in the table structure of Figs. 1 to 9.
Figure 11:
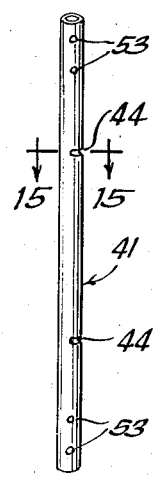
Figure 12:
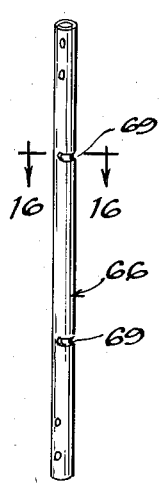
Figure 13:
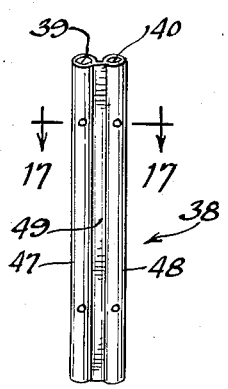
Fig. 13 is a perspective view of a common type of hinge connector member arranged in accordance with the invention.
Figure 14:
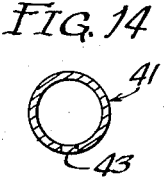
Figure 15:
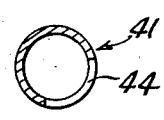
Figures 16, 17:
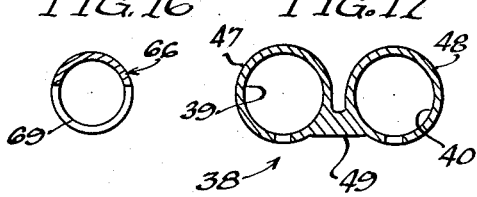

The top frame 58 is connected with the main frame member cross element 24 by a hinge of similar arrangement to those described above, but specially adapted to give to it a complex swing motion that permits the frame 58 and a table top 59 attached to it to be moved from their horizontal position to their vertical, folded position, wherein, as clearly seen in Fig. 4, they lie in offset relation to and alongside main frame member 25. This complex swing movement includes a ninety degree movement of frame 58 about the axis 61 (Fig. 3) of the one of its side elements 62 that is more adjacent the main member cross element 24, and a one hundred eighty degree movement of the frame 58, and also connector 63 of the hinge that connects elements 62, 24, about the axis 64 of element 24. The hinge in question, of which connector 63 forms a part is of the same general arrangement as above described, including tubular pivot members 65, 66 that respectively intervene between, extend into and have their ends fixed in end parts of elements 62, 24, and penetrate the cylindrical bores of the connector 63. To provide the ninety degree swing of frame 58 about axis 61 of the frame side element 58 tubular pivot member 65 is provided with a pair of pockets 67 (Fig. 5) extended about it circumferentially for ninety degrees in appropriate orientation and penetrated by radial pins 68. These pockets permit the tubular member 65 to swing about axis 64 with the frame 58, while the connector 63 remains in the same position. The one hundred eighty degree swing of connector 63 and frame 58 about axis 64 is permitted by pockets 69 extended a corresponding angular distance about pivot member 66 in appropriate orientation, and penetrated by pins 70. A pivot member 66 with one hundred eighty degree pockets 65 is shown in Figs. 12 and 16. These pockets permit connector 63 and frame 58 to swing together about axis 64 and pivot member 66, while the latter remains in the same angular position. It will be seen that the element 41 of Figs. 11 and 15 may serve as the pivot member 65.

As seen in Fig. 2, frame 58 advantageously is a rectangular closed frame including end elements 71 and a second side element 72, in addition to the previously mentioned element 62. Table top 59 advantageously is in the form of a tray with a raised and flanged rim 73 and a dished, supporting portion 74, so contoured that the latter snugly is received within frame 58 with flanged rim 73 contacting the frame and supporting the tray while in the use position. A pair of spring clips 75, shown in Fig. 20, are arranged to grip the end members 71 of frame 58. These clips are mounted to the underside of the end portions of flange 73, which are sufficiently long to overlie and extend beyond the outermost marginal portions of the end frame members 71. The clips are of rebent, resilient metal with flanges 76 secured to the undersides of the tray flanges 73, and gripping portions 77 configured to be sprung aside as the tray is lowered into frame 58 and to grip the end pieces 71 below their centers, as shown in Fig. 20. Finger pieces 78 are positioned to be readily contacted by a person's fingers as they grip the tray flange for raising the tray. Upward pressure on finger pieces 78 readily releases the catches from frame members 71 to free the tray.

The procedure in folding the table top is shown in Figs. 1, 3, 4 and 2. First the top assembly 58, 59 is swung up and rightward, or clockwise as seen in Fig. 3, first through a ninety degree movement about axis 61 of the frame element 62, as permitted by the pin and slot coupling 68, 67 and to the dotted line position $a$ of Fig. 3, then through one hundred eighty degrees about axis 64 of the main frame cross element 24, as permitted by the pin and slot coupling 70, 69, through the midposition shown in dotted lines at $b$, Fig. 3 and to the final position of Fig. 4. During this motion the tray flange enters the groove in the hinge connector that is provided by the offset nature of the web 49. Folding of the support part of the structure then can be accomplished by successively folding inward the side members, first the one that pivots about the axis of the adjacent main member leg element, here the left hand member 32 (as seen in Fig. 8) and then the other member, which as shown, pivots about the axis of its own leg element, here element 27.

From the foregoing the concepts and nature of the herein disclosed invention will be apparent, as will its many advantages, and it will be understood that many changes in our modifications of the purely exemplary specific disclosure may be made while employing the invention and obtaining benefit of its advantages. Consequently it will be understood that the scope of the invention and of patent protection accorded it are to be ascertained solely from the appended claims.

I claim:

1. A hinge assembly comprising a pair of elements that relatively are to swing and that are disposed alongside and are narrowly spaced from each other and the said elements each having a portion that is cylindrical and in lateral registration with the cylindrical portion of the other, a connector member having therethrough a pair of parallel, cylindrical bores in the different ones of which the said cylindrical portions of the different said elements are contained, and radial pins penetrating said connector members and including different pins that respectively project into said bores, the said cylindrical elements being provided with pockets into which said pins project and the said pockets of at least one said element being extended circumferentially of its said cylindrical member to permit rotative movement between that said element and the said connector.

2. A hinge assembly according to claim 1, wherein said cylindrical portions are of smaller cross sections than and are interposed between other portions of said elements, and said connector has different portions respectively disposed between said other portions of the said elements.

3. A hinge assembly according to claim 1 wherein each of said elements comprises a pair of sections each having a bore opening through its end and said cylindrical portions comprise cylindrical members having end portions secured in said bores and fixed therein against rotation relative to said sections.

4. A hinge assembly according to claim 1, wherein each of said elements comprises a pair of sections each having an axial bore opening through its end, each said cylindrical portion comprises a tubular cylindrical member having its ends secured in the bores of the sections of the element of which it forms a portion and fixed therein against rotation relative to those sections, and wherein said pockets open through the walls of the parts of said tubular elements lying between adjacent element section ends that it interconnects.

5. A foldable support structure comprising a pair of side members each having a leg element adapted for vertical disposition, an intervening main member having a pair of spaced leg elements that also are adapted for vertical disposition, a pair of hinge assemblies each interconnecting a different one of said side member leg elements and a different one of said main member leg elements, said assemblies respectively being connected to and extended between the pair of leg elements that it interconnects and maintaining them substantially parallel, a first of said assemblies being fixed against swinging movement relative to the side member leg element to which it is connected and swingable relative to the main member leg element to which it is connected, the second said assembly being fixed against swinging relative to the main member leg element to which it is connected and swingable relative to the side member leg element to which it is connected, each of said hinge assemblies comprising a connector member extended between the leg elements to which it is connected, an intermediate cylindrical portion of a different second one of the leg elements that it interconnects and that is extended through a different one of said bores, and means securing against relative swinging movement the said connector and the said cylindrical portion of the leg element with respect to which said assembly is fixed against relative swinging.

6. A foldable support structure comprising a pair of side members each having a leg element adapted for vertical disposition, an intervening main member having a pair of spaced leg elements that also are adapted for vertical disposition, a pair of hinge assemblies each interconnecting a different one of said side member leg elements and a different one of said main member leg elements, said assemblies respectively being connected to and extended between the pair of leg elements that it interconnects and maintaining them substantially parallel, a first of said assemblies being fixed against swinging movement relative to the side member leg element to which it is connected and swingable relative to the main member leg element to which it is connected, the second said assembly being fixed against swinging relative to the main member leg element to which it is connected and swingable relative to the side member leg element to which it is connected, each of said leg elements comprising a pair of sections each having a bore opening through its end, and each of said hinge assemblies comprises a cylindrical member having its ends secured in the bores of the sections of a leg element, spacing said sections apart and having its end secured against rotation in said bores, a connector having portions respectively disposed between the section of the different leg elements that it interconnects, and said portions being provided with cylindrical bores containing intermediate portions of said cylindrical members.

7. A foldable support structure comprising a pair of side members each having a leg element adapted for vertical disposition, an intervening main member having a pair of spaced leg elements that also are adapted for vertical disposition, a pair of hinge assemblies each interconnecting a different one of said side member leg elements and a different one of said main member leg elements, said assemblies respectively being connected to and extended between the pair of leg elements that it interconnects and maintaining them substantially parallel, a first of said assemblies being fixed against swinging movement relative to the side member leg element to which it is connected and swingable relative to the main member leg element to which it is connected, the second said assembly being fixed against swinging relative to the main member leg element to which it is connected and swingable relative to the side member leg element to which it is connected, each of said leg elements comprising a pair of sections each having a bore opening through its end, and each of said hinge assemblies comprises a cylindrical tubular element having end portions secured in the bores of the sections of a said leg element, a connector having portions that intervene between the sections of the different leg elements connected by that assembly and provided with bores wherein said tubular members are disposed, the ones of said tubular members that interconnect the sections of the leg elements that are swingable relative to said connector being provided with externally open pockets that are located between the leg element sections and that extend circumferentially about said members an angular distance of substantially ninety degrees, the other said tubular members having externally open pockets located between the leg sections, radial pins penetrating said connector and projecting into said circumferential pockets in orientation to permit swinging movement of said leg elements through ninety degree arcs extended outward from a common plane extended through said main member by elements, and stop pins penetrating said connector, having cross sections matching those of the pockets of said other tubular members and projecting into them.

8. A folding top table assembly comprising structure provided with an elongate cross element that is supported horizontal while the assembly is in use and a pair of side supports adapted to provide underlying support on a table top in a position of use, a table top structure including an elongate side element, and a hinge assembly interconnecting said cross and side elements and maintaining them parallel, said hinge element providing swinging movement of said top structure between its horizontal use position, upward and over said cross element and to a vertical position extended downward from alongside it, and including a cylindrical intermediate portion of each said element, a connector having spaced parallel bores respectively containing the different said cylindrical portions, means permitting said side element to swing about the axis of said cross element through a path of one hundred eighty degrees and between limit positions wherein respectively it lies horizontally alongside said cross member while the latter is in its said horizontal disposition, and means permitting said side member to rotate about its own axis through a path that is extended substantially ninety degrees and oriented to extend from the horizontal use position of the table top to a vertical position.

9. A folding table comprising a pair of side members, each including a pair of parallel spaced arms adapted to serve respectively as a foot and a top support while maintained in vertically spaced, horizontal disposition, and a leg element interconnecting corresponding ones of their ends and adapted for vertical disposition to so maintain said arms, a main member comprising a pair of leg elements adapted for vertical disposition and a cross element interconnecting their upper ends and arranged for horizontal disposition while they are vertical, a pair of hinge assemblies each interconnecting a different one of said main member leg elements and the leg element of a different said side member, a first of said assemblies permitting relative swinging movement of the side member and main member leg element that it interconnects only about the longitudinal axis of the latter element and through an angle of substantially ninety degrees from the plane of the axes of both said main member leg elements, the second said assembly permitting relative swinging between the main member leg element and the side member leg element that it interconnects only about the longitudinal axis of the latter element and through an angle of substantially ninety degrees from a plane parallel to the first said plane, a table top structure including a side element disposed parallel to said cross element and a third hinge assembly interconnecting said side element and cross element and permitting said table top to swing about the axis of said side element through an angle of substantially ninety degrees from a position wherein said top is supported on said supporting side member arms and permitting said side element to swing about the axis of said cross element through an angle of substantially one hundred eighty degrees from the position that it occupies relative to said cross element while said top is so supported.

References Cited in the file of this patent

UNITED STATES PATENTS

| 2,053,789 | Hardy | Sept. 8, 1936 |
| 2,229,411 | Hughes | Jan. 21, 1941 |
| 2,692,175 | Jacques | Oct. 19, 1954 |
| 2,762,669 | Watson | Sept. 11, 1956 |

FOREIGN PATENTS

| 181,496 | Switzerland | Mar. 2, 1935 |